United States Patent Office 2,883,287
Patented Apr. 21, 1959

2,883,287

TREATMENT OF PRODUCE

Milton Kosmin and Joseph E. Fields, Dayton, Ohio, assignors to Monsanto Chemical Company, St. Louis, Mo., a corporation of Delaware No Drawing. Application January 28, 1957
Serial No. 636,473

6 Claims. (Cl. 99—154)

The present invention relates to treatment of produce for the prevention of attack by microorganisms and is particularly directed to processes wherein fresh fruits and vegetables are treated for protection against attack by molds, fungi and bacteria.

In the preparation for marketing of produce destined for transportation and/or storage over long periods of time, it is customary to treat the fresh fruits and vegetables with preservative or microorganism-inhibiting compositions or to wrap them in papers which have been impregnated with such compositions. In prior art such treatment comprised, e.g., coating with waxes or other water-impermeable coatings, dipping in or spraying with emulsions or solutions of antiseptics or fungicides, contacting with vapors or gases having a destructive effect on the micro-organisms, etc. Although such prior treatments met with varying success difficulties have been generally encountered. While the water-impermeable coatings kept the produce from dehydrating, they also fostered the growth of anaerobic organisms present on the produce prior to the coating step. Treatment of the produce with compositions toxic to micro-organisms often resulted in injury to the produce, itself; or such compositions even though not toxic to humans, frequently were objectionable in that they imparted undesirable odor, flavor and/or taste to the treated produce and sometimes left an unsightly residue on the surface of the fruits and vegetables.

The present invention provides a new and very valuable process of protecting against attack by microorganisms, of fresh fruits and vegetables, e.g., citrus fruits such as oranges, lemons, tangerines and grapefruit; fruits of the Malaceae family such as the apple, pear and quince; those of Prunus specie such as plum, cherry, peach and apricot; berries such as the strawberry, blueberry, blackberry and loganberry; melons such as the cantaloupe and honey-dew melon, vegetables such as tomatoes, potatoes and onions, etc.

In accordance with the invention, protection of fruits and vegetables against decay, rot, and other deterioration caused by microorganisms is effected by contacting the fruits and vegetables with a composition comprising a water-soluble derivative of a maleic acid-lower olefin copolymer of the formula

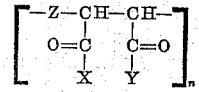

wherein Z is a bivalent alkylene radical of from 2 to 4 carbon atoms, X and Y are radicals selected from the class consisting of —OH, ONH₄, —ONRH₃, ONR₂H₂, —ONR₃H, —ONR₄, —NH₂, —NHR, and —NR₂, R being an alkyl radical of from 1 to 3 carbon atoms, only one of the X and Y radicals being —OH, and wherein X and Y together may be >NH or >NR, and n is an integer indicative of the state of polymerization. Generally, n may be from 10 to 200.

One class of presently useful copolymers includes salts of maleic acid-C₂–C₄ aliphatic, mono-olefin copolymers with ammonia or an alkylamine having from 1 to 3 carbon atoms in the alkyl radical. Such salts have the formula

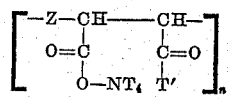

where T is hydrogen or an alkyl radical of from 1 to 3 carbon atoms and T' is selected from the class consisting of —ONT₄ and —OH. Copolymers having the above formula includes the mono-ammonium or diammonium salts of maleic acid-ethylene copolymer, of maleic acid-propylene copolymer, or of maleic acid-1- or 2-butene copolymer; the mono- or di-alkylamine salts of such copolymers, e.g., the methyl-, ethyl- or isopropylamine salt of maleic acid-ethylene or propylene copolymer, the dimethyl-, methylethyl-, diethyl-, or di-n-propylamine salt of maleic acid-ethylene or 1-butene copolymer, the trimethyl-, triethyl-, triisopropyl-, or diethyl-n-propylamine salt of maleic acid-ethylene or propylene copolymer; and mixed ammonium alkylamine salts such as the ammonium n-propylamine salt or the ammonium trimethyl amine salt of maleic acid-ethylene or propylene copolymer.

Another class of presently useful copolymers includes the mono- and diamides of maleic acid-ethylene, propylene or 1- or 2-butene copolymers as well as the corresponding N-alkyl or N,N-dialkyl amides. This class may be represented by the formula

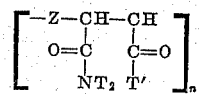

in which Z is an alkylene radical of from 2 to 4 carbon atoms, T is hydrogen or an alkyl radical of from 1 to 3 carbon atoms, T' is selected from the class consisting of —NT₂ and —OH, and n is an integer indicating the degree of polymerization. As illustrative of copolymers having the above formula may be mentioned the monoamide of maleic acid-ethylene or propylene copolymer, the diamide of maleic acid-ethylene or 2-butene copolymer, the N,N'-dimethyl-, N,N'-diethyl-, N,N'-di-n-propyl- or N,N'-methylethyl diamide of maleic acid-ethylene or propylene copolymer and the N,N,N',N'-tetramethyl-, N,N,N',N'-tetraethyl-, N,N,N',N'-tetra-n-propyl- or N,N'-dimethyl-, N',N'-diethyl diamide of maleic acid-ethylene, propylene or -1-butene copolymer.

Still another class of the presently useful derivatives of maleic acid-C₂–C₄ aliphatic mono-olefin copolymers includes the half ammonium salts, half amides of the formula

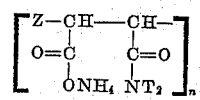

in which T is selected from the class consisting of hydrogen and alkyl radicals of from 1 to 3 carbon atoms and Z and n are as herein defined. Representative members of this useful class include the ammonium salt of maleic acid-ethylene or propylene copolymer mono-amide, the ammonium salt of maleic acid-ethylene or propylene copolymer N-methyl-, N-ethyl-, N-n-propyl or N-isopropyl-mono-amide and the ammonium salt of maleic acid-ethylene or propylene copolymer N,N-dimethyl-, N,N-diethyl-, N,N-ethyl-, methyl- or N,N-di-n-propyl-mono-amide.

Also presently useful are the imides of maleic acid-$C_2$-$C_4$ aliphatic, mono-olefin copolymers of the formula

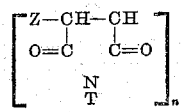

in which T is selected from the class consisting of hydrogen and alkyl radicals of from 1 to 3 carbon atoms and Z and $n$ are as herein defined. Examples of imides having the above formula include the imide of maleic acid-ethylene copolymer, the imide of maleic acid-propylene copolymer, the imide of maleic acid-2-butene copolymer or the N-methyl, N-ethyl, N-propyl or N-isopropyl derivatives of such imides.

The above presently useful salts, amides, half salts-half amides, and imides of maleic acid-$C_2$-$C_3$ aliphatic, mono-olefin copolymers are known materials which are obtainable in commerce or by methods well known to those skilled in the art. For convenience, however, a résumé of such methods is given herewith.

In practice, the present water soluble derivatives of maleic acid-olefin copolymers are prepared from readily available maleic anhydride-olefin copolymers, for example, as described in the Hanford U.S. Patents 2,378,629 and 2,396,785. Generally, the copolymers are prepared by reacting ethylene, propylene, 1- or 2-butene or mixture of these olefins with maleic anhydride in the presence of peroxide catalyst in an aliphatic or aromatic hydrocarbon which is a solvent for the monomers but is a non-solvent for the interpolymer formed. Suitable solvents include benzene, toluene, xylene, chlorinated benzene, hexane, acetone and the like. While benzoyl peroxide is the preferred catalyst, other peroxides such as acetyl peroxide, butyryl peroxide, di-tertiarybutyl peroxide, lauroyl peroxide and the like are all satisfactory since they are soluble in organic solvents. The copolymer contains substantially equimolar quantities of the ethylene residue and the maleic anhydride residue. The properties of the polymer such as molecular weight, for example, may be regulated by proper choice of the catalyst and control of one or more of the variables such as ratio of reactants, temperature, and catalyst concentration. The product is obtained in solid form and is easily recovered by filtration, centrifugation or the like. Removal of any residual or adherent solvent may be effected by evaporation using moderate heating.

The maleic anhydride copolymers thus obtained have the formula

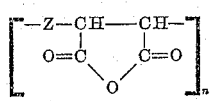

where Z corresponds to an alkylene radical having the carbon content of the olefin monomer which was used and $n$ denotes the degree of polymerization.

Said anhydride copolymers are readily hydrolyzed by heating with water to yield the acid form of the copolymer:

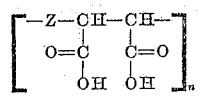

The mono- or diammonium salts may be readily obtained by reacting the copolymer in its anhydride or acid form with the stoichiometric amount of ammonium hydroxide. The 1-3 C mono-, di- or tri-alkyl amine salts are prepared by reacting the copolymer in its acid form with the appropriate amine, e.g., methylamine, triethylamine or diisopropylamine; whether a mono-salt or a di-salt is formed depends upon whether the quantity of alkylamine used is sufficient to react with both carboxy groups or sufficient only for the neutralization of one carboxy group. Mixed salts, e.g., half ammonium, half alkylamine salts are prepared by first reacting with a quantity of ammonium hydroxide calculated to give the partial ammonium salt and then reacting the residual free carboxy radical with sufficient alkylamine to neutralize said radical.

Amides are prepared generally by reacting the finely divided maleic anhydride-$C_2$-$C_4$ olefin copolymer with ammonia gas at ordinary or elevated temperatures, and the N-alkyl or N,N-dialkyl amides by employing an N-alkyl, or N,N-dialkyl amine instead of ammonia. For the formation of the diamide or the N,N-dialkyldiamides or the N,N,N',N'-tetraalkyldiamides substantially anhydrous conditions are observed. Half-salts, half-amides (or the alkyl-substituted amides) are formed by operating in the presence of the stoichiometrically required quantity of moisture. Heat is generally liberated in the preparation of the half-ammonium salt, half-amide, and it is thus desirable to provide some means for dissipating it so that the product will not be affected by excessively high temperatures. One effective means for controlling the heat of reaction consists of suspending the solid polymer in an inert organic liquid such as benzene and bubbling ammonia through the slurry.

The half-amide, half-ammonium salt may be converted to the imide derivative by heating at a temperature of from about 60° C. to 150° C.

The invention is further illustrated, but not limited, by the following examples:

*Example 1*

This example describes vapor-phase testing of (I) the diammonium salt of ethylene-maleic anhydride copolymer and (II) the half-amide, half ammonium salt of ethylene-maleic anhydride copolymer against *Penicillium italicum* which is the causative agent of green mold on citrus fruits, *Penicillium digitatum* which causes blue mold on said fruits, and the fungi *Phomopsis citrii* and *Diplodia natalensis* which are responsible for button or stem-end rot or decay.

Sabouraud dextrose agar slants which had been inoculated by one of the respective organisms were used. Six sets of four inoculated slants (one slant for each of the 4 test organisms) were prepared and each set was placed in a 1-quart jar. Each of two sets were then subjected to the vapors of 1.1 g. of (I), each of another two sets to the vapors of 1.1 g. of (II) and the remaining two sets were allowed to remain untreated to serve as blanks. They were then all incubated at room temperature for 2 weeks. Inspection at the end of that time showed that in the four treated sets, i.e., those which had been subjected to either (I) or (II) the growth of all four of the test organisms had been completely inhibited, whereas the untreated two sets, i.e., the "blanks", showed flourishing and abundant growth of the four test organisms.

*Example 2*

Lemons were inoculated by injuring the rinds thereof and dipping the wounded sections in a spore suspension of *Penicillium italicum*. They were then placed in 1-quart jars, six lemons being used per jar. Into each jar there was introduced the vapor of either 1.1 g., 0.55 g. or 0.275 g. of (I) the diammonium salt of ethylene-maleic anhydride copolymer or 1.1 g., 0.55 g., or 0.275 g. of (II) half-amide, half-ammonium salt of ethylene-maleic anhydride copolymer. Since the tests were run in duplicate, a total of twelve jars of lemons were used. The thus-treated lemons, as well as similarly injured and inoculated lemons which had not been treated with either (I) or (II), were then incubated at room temperature for two weeks. Inspection of the incubated lemons at the end of that time showed substantial inhibition of microorganisms on the fruit which had been treated with even the lowest concentration, i.e., the 0.275 g. of either (I) or (II) whereas the untreated lemons were heavily overgrown with the *Penicillium italicum*.

Example 3

A 2.5 percent aqueous solution of the half-amide, half-ammonium salt of ethylene-maleic anhydride copolymer was prepared and heated to a temperature of 118° F. Valencia oranges were then dipped for 4 minutes into the heated solution and then allowed to dry at room temperature. No discoloration, injury or off-taste of the thus-treated oranges was evidenced. At the same time, "blanks" were prepared by dipping some of the same crop of Valencia oranges into water at 118° F. for 4 minutes. The fruit which had been treated with the solution of said half-amide, half-salt and the blanks were then crated and stored at ordinary atmospheric conditions. During storage, at a time when inspection of the "blanks" showed a large number of decayed fruits in crates thereof, substantially no decayed fruit was observed in the crates of fruit which had been treated with said half-amide, half-salt.

In addition to suppression of mold growth, treatment of fruits and vegetables with the present water-soluble derivatives of $C_2$–$C_4$ mono-olefin-maleic anhydride copolymers has the advantage of forming an attractive, glossy film over the individual pieces of fruit. Mechanical injury to the fruit is thereby minimized and desiccation is substantially prevented. Being readily water-soluble, the film can be easily removed from the treated fruit if desired. The present process thus provides not only the protection against damage and dehydration afforded by prior art paraffin wax treatment but also the protection against attack by microorganisms which the prior wax treatments did not render. Moreover, the present treatment provides such protection without resorting to the use of either water-impervious envelopes or difficultly removable, offensive coatings.

Although very good results are obtained by treating produce with vapors of the present salts or amides or by dipping said produce into an aqueous solution of the same, the present water-soluble derivatives of $C_2$–$C_4$ monolefin-maleic anhydride copolymers may also be applied to the fruits and vegetables by spraying the aqueous solutions of said derivatives upon the surfaces thereof. Obviously for easy adherence of the sprayed materials the produce should not have been previously paraffin-coated. Prior to either the vapor-phase, dipping or spraying treatment the fruit is preferably cleansed of at least coarse soils.

Where, as in the citrus industry, it is customary to employ food dyes in preparing the fruits for market, the dyeing step is advantageously combined with the present protective step, i.e., the dye or dyes may be incorporated into baths containing the present olefin-maleic acid copolymer derivatives and the dyeing and coating processes effected in the one step. Frequently the presently employed derivatives serve as suspending or emulsifying agents for the dyes.

Protection of fruits and vegetables against fungus attack and decay may also be provided by wrapping the produce in papers which have been treated or impregnated with the present salts or amides.

What we claim is:

1. The method of protecting fruits and vegetables against attack by molds and fungi which comprises contacting the fruits and vegetables with a mold- and fungus-resisting quantity of a protective composition comprising, as the essential active ingredient, a water-soluble copolymer of the formula

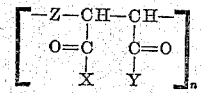

wherein Z is a bivalent alkylene radical of from 2 to 4 carbon atoms, X and Y are radicals selected from the class consisting of —OH, $ONH_4$, $ONRH_3$, $ONR_2H$, —$ONR_3H$, —$ONR_4$, —$NH_2$, —NHR, and —$NR_2$, R being an alkyl radical of from 1 to 3 carbon atoms, only one of the X and Y radicals being —OH, and wherein X and Y together may be selected from the class consisting of >NH and >NR, and $n$ is an integer indicative of the state of polymerization.

2. The method of protecting citrus fruit against attack by molds and fungi which comprises applying to said fruit a mold- and fungi-resisting quantity of a composition comprising, as the essential active ingredient, a water-soluble copolymer of the formula

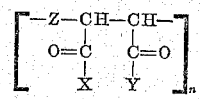

wherein Z is a bivalent alkylene radical of from 2 to 4 carbon atoms, X and Y are radicals selected from the class consisting of —OH, $ONH_4$, $ONRH_3$, $ONR_2H$, —$ONR_3H$, —$ONR_4$, —$NH_2$, —NHR, and —$NR_2$, R being an alkyl radical of from 1 to 3 carbon atoms, only one of the X and Y radicals being —OH, and wherein X and Y together may be selected from the class consisting of >NH and >NR, and $n$ is an integer indicative of the state of polymerization.

3. The method of protecting citrus fruit against attack by molds and fungi which comprises applying to said fruit a mold- and fungi-resisting quantity of a composition comprising, as the essential active ingredient, a water soluble copolymer of the formula

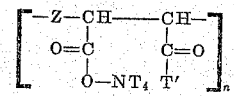

in which Z is a bivalent alkylene radical of from 2 to 4 carbon atoms, T is selected from the class consisting of hydrogen and alkyl radicals of from 1 to 3 carbon atoms, T' is selected from the —$ONT_4$ and OH, and $n$ is an integer indicative of the state of polymerization.

4. The method of protecting citrus fruit against attack by molds and fungi which comprises applying to said fruit a mold- and fungi-resisting quantity of a composition comprising, as the essential active ingredient, a water soluble copolymer of the formula

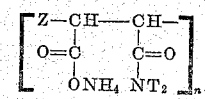

in which Z is a bivalent alkylene radical of from 2 to 4 carbon atoms and T is selected from the class consisting of hydrogen and alkyl radicals of from 1 to 3 carbon atoms.

5. The method of protecting citrus fruits against attack by molds and fungi which comprises applying to said fruit a mold- and fungi-resisting quantity of a composition comprising as the essential active ingredient the diammonium salt of ethylene-maleic anhydride copolymer.

6. The method of protecting citrus fruits against attack by molds and fungi which comprises applying to said fruit a mold- and fungi-resisting quantity of a composition comprising as the essential active ingredient the half-amide, half-ammonium salt of ethylene-maleic anhydride copolymer.

References Cited in the file of this patent

UNITED STATES PATENTS

| | | |
|---|---|---|
| 2,022,139 | Hanford | Nov. 26, 1935 |
| 2,396,785 | Hanford | Mar. 19, 1946 |

OTHER REFERENCES

"Chemicals Evaluated as Insecticides," King, May 1954, pp. 220–221.